United States Patent [19]  [11] 4,240,205
Tuss  [45] Dec. 23, 1980

[54] COORDINATE MEASURING MACHINE

[75] Inventor: John J. Tuss, Englewood, Ohio

[73] Assignee: The Bendix Corporation, Southfield, Mich.

[21] Appl. No.: 67,962

[22] Filed: Aug. 20, 1979

[51] Int. Cl.³ .............................................. G01B 5/02
[52] U.S. Cl. .................................... 33/1 M; 33/1 MP
[58] Field of Search ................... 33/1 M, 1 MP, 27 C

[56] References Cited

U.S. PATENT DOCUMENTS

| 1,421,921 | 7/1922 | Doerr | 33/27 C |
|---|---|---|---|
| 2,933,827 | 4/1960 | Alberts | 33/27 C X |
| 3,346,724 | 10/1967 | Fuhrmeister et al. | 33/1 MP X |
| 3,561,125 | 2/1971 | Zeidler | 33/1 M |
| 3,944,798 | 3/1976 | Eaton | 33/1 M |

Primary Examiner—William D. Martin, Jr.
Attorney, Agent, or Firm—Kenneth A. Seaman

[57] ABSTRACT

A coordinate measuring machine for measuring parts using cylindrical coordinates. The machine includes a base, an articulated arm mounted to the base at its proximate end for movement within a plane, and a vertically movable probe assembly mounted near the distal end of the articulated arm. A horizontal measuring rod extends between the distal end of the arm and the base to provide a measurement of the location of the probe with respect to the base, in terms of a radius and an angular displacement. The probe assembly includes means for measuring perpendicular displacement of the probe from the plane of the articulated arm.

10 Claims, 4 Drawing Figures

4,240,205

COORDINATE MEASURING MACHINE

BACKGROUND OF THE INVENTION

The present invention relates to coordinate measuring machines. More particularly, the present invention is a machine for measuring and inspecting parts to a high accuracy (e.s., thousandths of an inch) wherein the machine measures displacement from a reference point in cylindrical coordinates. Cylindrical coordinates are a radius and an angular displacement within a plane from a fixed point and a perpendicular distance from the plane.

The prior art includes a number of coordinate measuring machines for measuring in rectangular coordinates. For the most part, these machines are referred to as "bridge" machines, "horizontal probe" machines, or "vertical probe" machines. Although each will be discussed in some detail, all have the characteristic of requiring rather long precision ways and guides. Such long precision ways are relatively expensive to manufacture and assemble in that they require precision machining to close tolerances. Such precision ways and guides are therefore undesireable in that they add significant expense to the manufacturing process.

Vertically mounted probe coordinate measuring machines are shown in various patents such as U.S. Pat. No. 3,403,448 to W. F. Aller entitled Measuring Machine. Such machines have long horizontal ways that require precision machining and additionally require very precise bearing systems to support accurately a moveable carriage which traverses across the ways.

One type of horizontal arm measuring machine is shown in U.S. Pat. No. 3,279,079 to Schiller for Inspection Machine. In such a machine, a horizontal arm is mounted on roller bearings or similar anti-friction materials to move vertically along vertical ways.

Bridge-type measuring machines are also well known in the prior art and include a carriage extending across and above the entire measuring work table. The carriage is supported on each end by a vertical support column which moves along horizontal ways along two parallel sides of the work table. Such machines usually require precision ways and that the carriage be accurately and securely coupled to the columns to minimize skewing.

Other bridge-type machines have been designed which minimize the effects of skewing but require relatively complex machanical and electronic designs which are undesirable.

Examples of such bridge type measuring machines are shown in U.S. Pat. Nos. 3,749,501 and 3,840,993.

As an alternate to the precision ways, some prior art measuring machines include an air assist between the moveable members. While such air assists may reduce the need for precision rails, the air assists add considerable complexity and expense to the machine especially since mechanical bearings are still required. Additional parts, manufacturing techniques and a source of pressurized air are required. One such pressurized air assist system for a measuring machine is shown in U.S. Pat. No. 4,099,800 to Tuss et al.

Many coordinate measuring machines have inherent stress conditions which result from the variable position of the probe (or other measurement member.) These machines have static and dynamic imbalances which are undesirable in that they create measurement errors.

Accordingly, the prior art measuring machines have undesirable disadvantages and limitations.

SUMMARY OF THE INVENTION

The present invention is an improved coordinate measuring machine which overcomes the undesirable disadvantages and limitations while providing a measuring machine which is accurate and relatively inexpensive and easy to manufacture and assemble.

The apparatus of the present invention is characterized by a lack of long precision way surfaces and guides. The avoiding of such long precision surfaces and guides is a particular advantage in the manufacturing process to reduce manufacturing costs and scrap.

The present invention features a measuring machine which measures in cylindrical coordinates in its preferred embodiment.

The apparatus of the present invention has an additional advantage that the movable members are counterbalanced about the axis of rotation. This facilitates an apparatus having static and dynamic balance which simplifies design and reduces the need to compensate for shifting weights.

An additional feature of the apparatus of the present invention is that the probe shaft has a uniform orientation with respect to the base for all probe locations. This permits the use of a probe tip located off the centerline, e.s., a probe tip extending at a right angle to the centerline of the probe shaft, without errors.

The invention is characterized by an arm mounted to rotate about a base at one end of the arm, with a perpendicularly movable probe mounted at a position at the other end. Means are provided for measuring the position of the probe-mounting position (in terms of an angle and a displacement) and for measuring the movement of the probe with respect to the arm. Preferably, the arm is an articulated arm and a separate measuring arm is provided to reduce measurement errors and inaccuracies from loading. In the preferred embodiment, a pair of connected four-bar supports connecting the base and the probe provide a uniform orientation of the probe.

Other objects and advantages of the present invention will be apparent from the following description of the drawings and the claims.

DETAILED DESCRIPTION OF THE DRAWINGS

Figure 1:
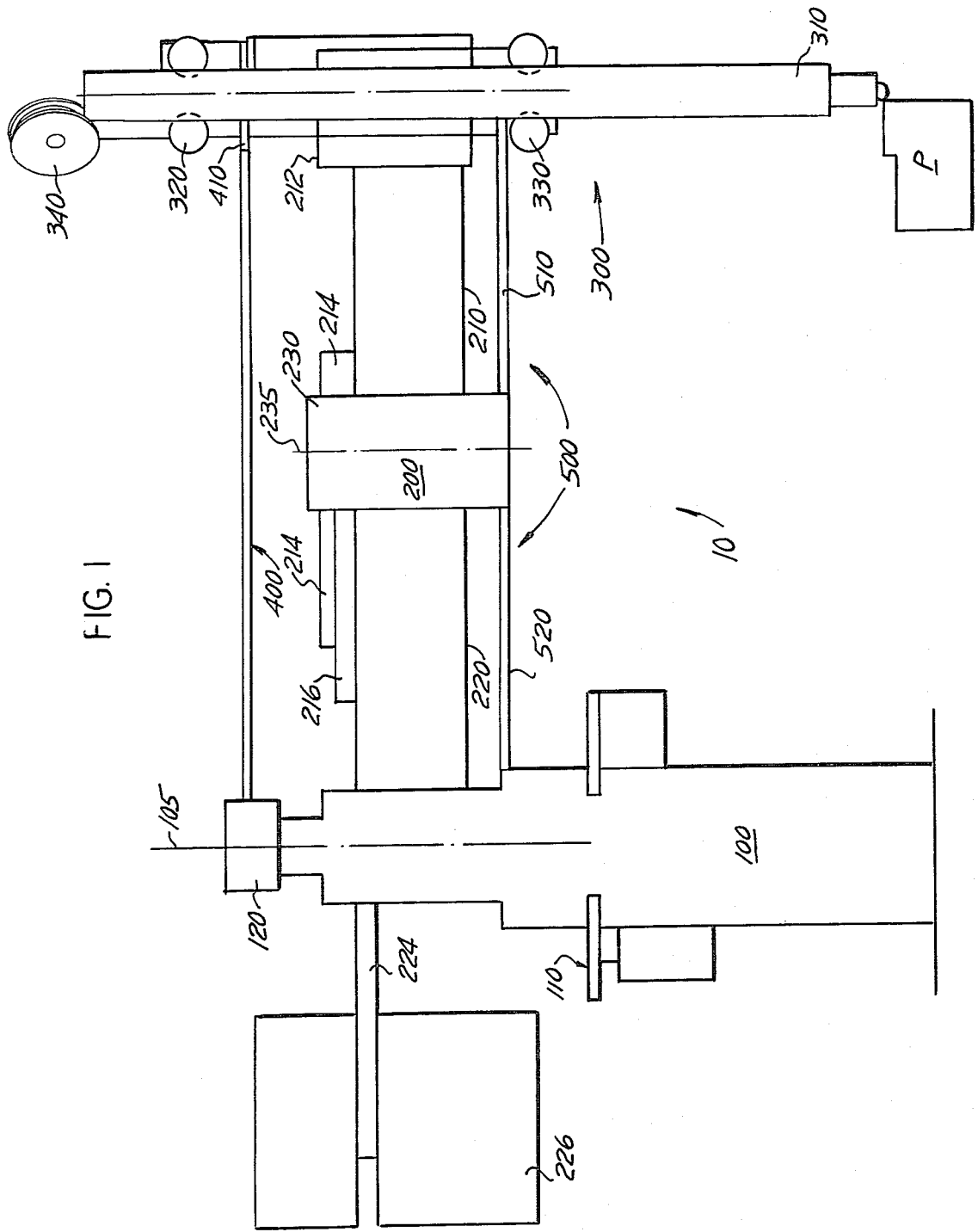
FIG. 1 is a partial cross-sectional side view of a coordinate measuring machine of the present invention.

FIG. 1 shows a partially cross-sectional side view of a coordinate measuring machine 10 of the present invention and a part P being measured. The measuring machine 10 includes a base 100, an articulated main support arm assembly 200, a probe assembly 300, and measuring rod 400 and a secondary support arm system 500.

As shown in FIG. 1, the base 100 extends vertically and mounts the articulated arm assembly 200 at or near its proximate end. The base 100 is generally cylindrical with a vertical axis 105 and includes a horizontally mounted rotational measurement system 110 and a linear displacement measurement system 120.

The articulated arm assembly 200 includes a first arm 210 and a second arm 220, pivotly mounted at a rotational joint 230 having a center line 235. The second arm 220 is mounted to the base 100 to rotate with respect to the vertical axis 105 of the base 100. The first arm 210 includes a yoke 212 mounted to the distal end thereof, and the yoke includes a central aperture through which the probe assembly 300 extends.

The first arm 210 includes a connecting extension 214 which extends around the joint 230 to a counterbalance weight 216. The counterbalance 216 has a weight which is positioned to balance the weight of the probe 300 and the first arm 210 about the center line 235 of the rotational joint 230. Although the arms have a substantial thickness, they are arranged to have a longitudinal axis which is vertical and in a common plane for the two arms.

The arm 220 includes a counterbalance weight 226 coupled by a connecting extension 224 which extends around the base 100, the counterbalance weight 226 balances the weight of the arm 220 and the weight of the counterbalanced arm 210 (which is counterbalanced to have an effective location at the joint end of the arm 220) at the vertical axis 105.

The probe assembly 300 includes a probe shaft 310, upper and lower bearing mounts 320, 330, respectively and counterbalance member 340. The counterbalance is is preferably of the type shown in U.S. patent application Ser. No. 904,171 filed by Tuss and Bell, the specification of which is specifically incorporated by reference. Additionally, the probe shaft 310 includes a measurement grating (not shown). The probe assembly 300 includes an optical Moirefringe dectector (a conventional measuring system) for detecting movement of the grating and probe shaft and generating a signal indicitive of its displacement. The probe shaft 310 is mounted and moves vertically along its axis 315.

The measuring bar 400 is mounted to the upper end of the probe assembly 300 by a yoke 410. The measuring bar 400 extends through the radial displacement measurement aparatus 120 mounted onto base 100 to indicate the distance displacement between the probe shaft axis 315 from the base axis 105.

The measuring bar 400 cooperates with the rotational measurement system 110 and the linear displacement measurement system 110 and the linear displacement measurement system 120 to generate radial (O) and distance (R) displacements (respectively between the axis 105 and the probe shaft axis 315.

The secondary arm connecting system 500 provides for maintaining the probe shaft 110 in a uniform orientation, as will be discussed in connection with FIGS. 3 and 4. A first arm 510 and 510 and a second arm 520 are included in the support system.

Figure 2:
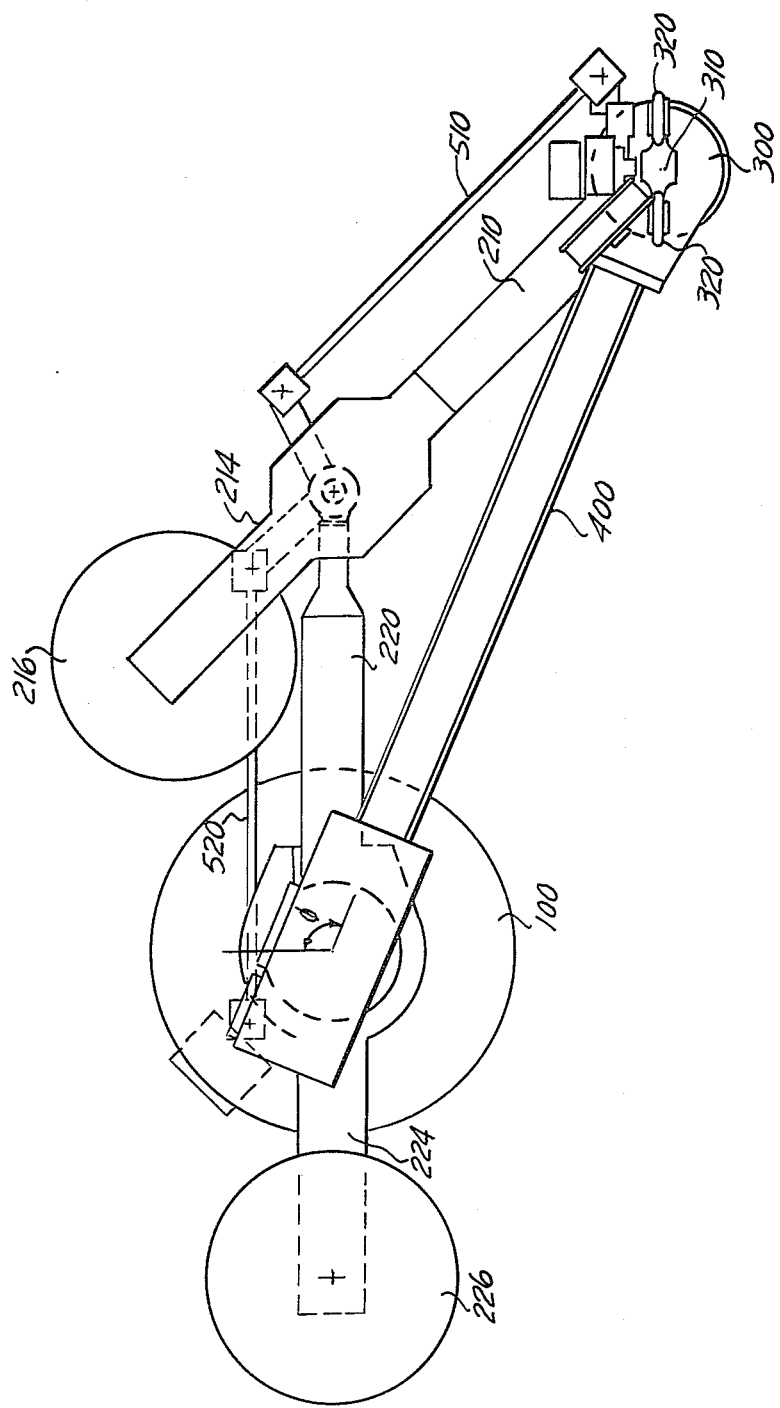
FIG. 2 is a top or plan view of the coordinate measuring machine of FIG. 1.

FIG. 2 is a plan or top view in partial cross sectional showing better the arrangement of the components of the measuring system 10. The base 100 and the probe assembly 300 are connected by first and second arms 210, 220 and the measuring bar 400. The secondary arm support 500 is shown, with the arms 510 and 520 being spaced from, but parallel to, the respective arms 210 and 220. The counterbalancing weights 216, 226 are shown, along with the connecting extensions 214, 224.

The secondary arm support system 500 includes the two arms 510, 520 which are mounted between the joint 230 and the probe assembly 300 and between the base 100 and the joint 230, respectively.

Figure 3:
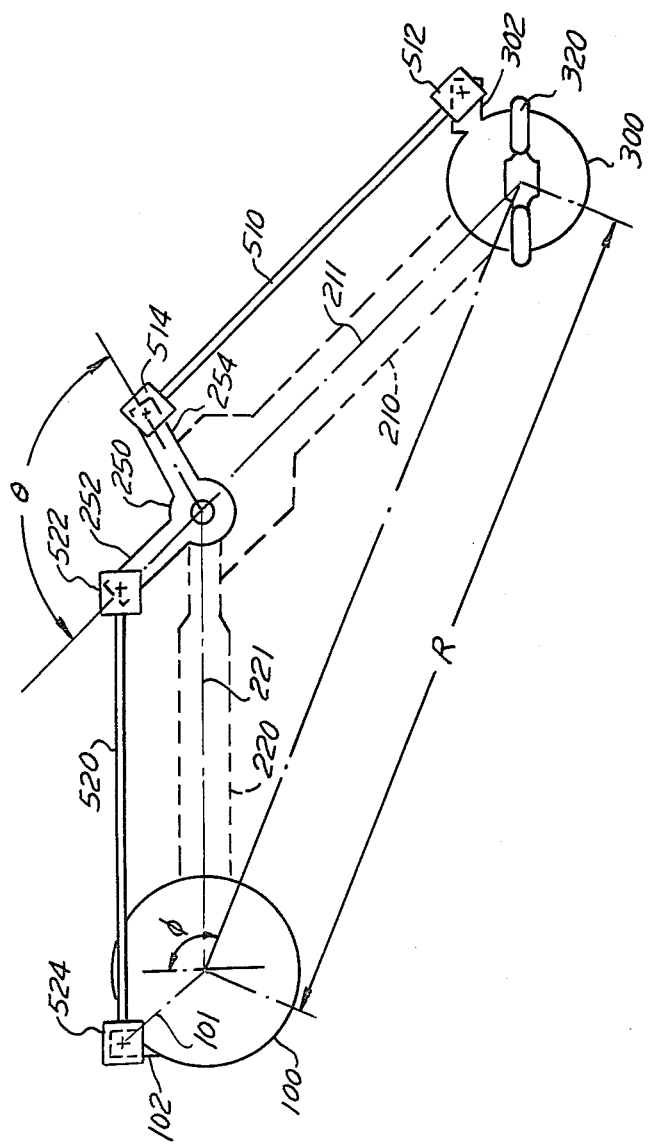
FIG. 3 is a cross-sectional view of a stablizer bar and probe orientation system of the present invention, looking generally along the line 3—3 in FIG. 1. A part-engaging probe is shown in a first position.

FIG. 3 is a view of the secondary arm connecting system 500, showing its structure in greater detail. The first and second arms 210, 220 and central longitudinal axis thereof labelled as 211, 221 have been shown by a dotted line to provide a better understanding of this figure of drawings.

The arms 510, 520 extend between arm end brackets 512, 514 and 522, 524, respectively. Each of the bracket 512, 514, 522, 524 is pivotally mounted to rotate about a center line marked with a "+". The bracket 512 is mounted to an ear 302 of the probe assembly 300. Brackets 514 and 522 are mounted to a V-shaped plate 250 at the ends of legs 252 and 254. Bracket 524 is mounted to ear 102 of the base 100.

Figure 4:
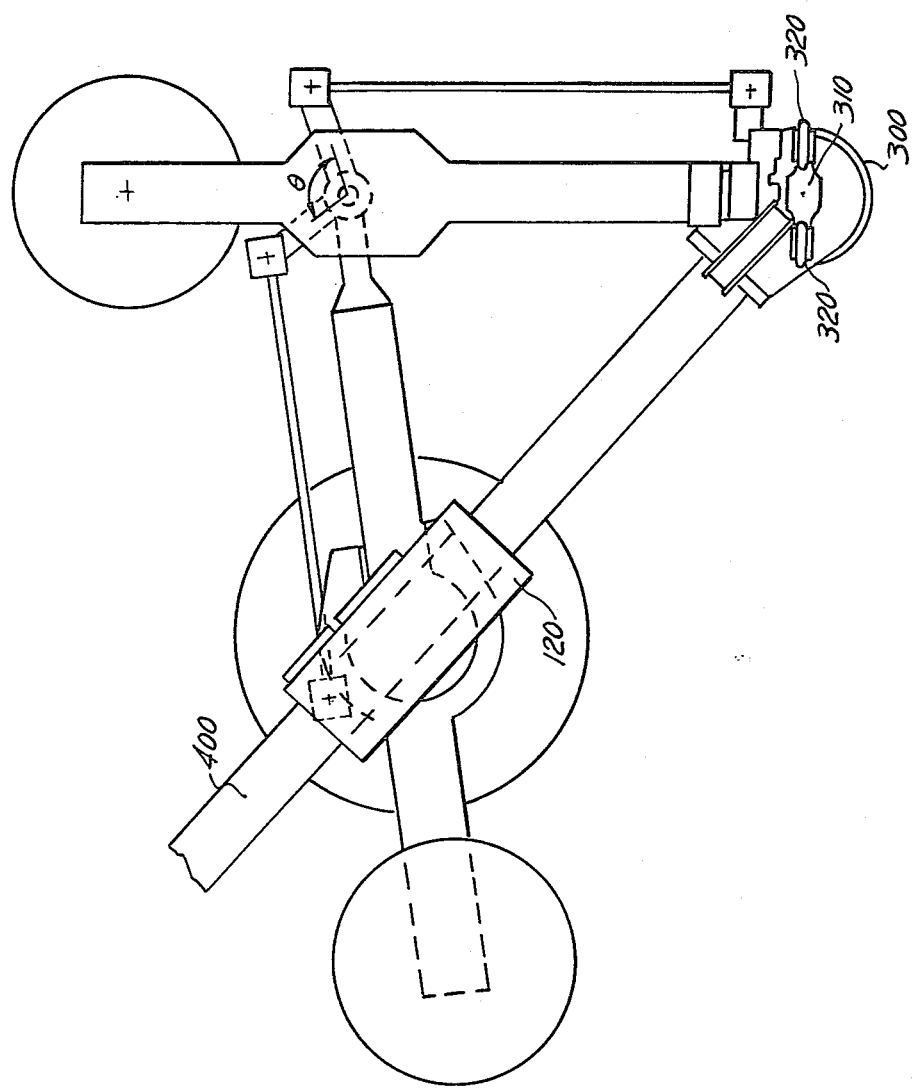
FIG. 4 is a cross-sectional view of the apparatus of FIG. 3 with the probe moved to measure at a different location.

FIG. 4 shows the machine 10 of FIG. 2 with the probe 300 moved to a different location. The orientation of the probe shaft 310 remains constant through the action of the two tied "four bar" structures (parallelograms) formed by the arms 510, 520, 210, 220, the plate 250 and the mountings to the ears 102, 302. Notice that the measuring bar 400 extends through the measuring assembly 120 because the radius (linear displacement) from the base has decreased.

The present apparatus generates a part coordinate in terms of a radius R, an angle $\phi$ and a height Z, e.g., cylindrical coordinates. Simple transformations might be made (e.s. by a microprocessor, a calculator or a computer) to transform these cylindrical coordinates into cartesian (x,y,z) coordinates if desirable.

The present invention has been described in its preferred embodiment with some specificity. However, those skilled in the art will recognize other alternative methods to practice the present invention and that some features may be used to advantage without use of other corresponding features. Accordingly, the foregoing description should be considered as merely illustrative of the present invention, and not limiting thereof, the scope of which is being described in the following claims.

Having thus described the invention what is claimed is:

1. An apparatus for measuring a part, said apparatus comprising:
   a base;
   a probe for engaging the part being measured;
   first and second arm members for coupling the probe to the base, said first and second arm members being coupled together at a joint and being movable through a first plane, said first arm member mounting said probe generally perpendicular to said plane and said second arm member mounted to said base;
   means for counterbalancing the weight of the probe and arm members about the base, said means including a first counterbalance member coupled to said first arm member for counterbalancing the weight of the first arm member and the probe about the joint and a second counterbalance member for counterbalancing about the base the weight of the second arm member and the counterbalanced first arm member; and means coupled between said base and probe for measuring the location of the probe as an indication of the measurement of the part being measured.

2. A coordinate measuring apparatus for measuring a feature on a part, said apparatus comprising:
a base;
an arm rotatably mounted in one plane to said base and having a variable displacement between the mounting to the base and the distal end thereof;
a probe extending from the arm at its distal end and being movable with respect to said arm to displace perpendicular to the plane of said arm, said probe including a probe tip for engaging the feature of the part to be measured; and
means for measuring the location of the probe tip with respect to said base, said means comprising:
means for measuring the location of the probe tip with respect to the distal end of the arm;
means for measuring the linear distance between the distal end of the arm and the base; and
means for measuring the angular displacement of the arm from the housing, whereby the location of a part feature may be measured by engaging it with the probe tip and measuring the part feature.

3. A coordinate measuring apparatus of the type described in claim 2 wherein the horizontal arm is an articulated arm including at least two members coupled by joint, with the two members rotating about the joint.

4. A method of generating part coordinates for a feature on an object, the steps of the method comprising:
coupling a probe to a radially movable arm mounted to a base;
displacing the probe to engage the feature on the part; and
generating values indicative of linear distance and angular displacement of the probe from the base and height information of the probe as a measurement of the position of the feature.

5. A coordinate measuring machine of the type described in claim 4 wherein coupling of said probe includes a first articulated arm member supporting the probe, and a second member including distance information for measuring position.

6. A three-dimensional measuring machine comprising:
a base;
a probe;
an articulated arm movably for coupling said probe to said base, said articulated arm including first and second members joined together at a rotatable joint, said articulated arm being movable but limited to movement within a plane;
means for mounting the probe to the first member of the articulated arm at its distal end to allow a displacement of the probe with respect to said plane, said probe mounting means including a movable mounting which allows the probe to displace perpendicular to said plane and means for measuring displacement of the probe from said plane;
means for counterbalancing said probe, said means including an extension of said first member extending around said joint to balance the probe and first member about the joint and an extension of said second member beyond the mounting of said second member to the base for counterbalancing the weight of the second member and said counterbalanced first member about the base; and
means mounted between said probe mounting means and said base for measuring the displacement of said probe mounting means with respect to said base, whereby the three-dimensional displacement of the probe may be measured.

7. A measuring machine of the type described in claim 6 wherein said measuring means includes a measuring bar rotatably mounted to the base and coupled to the probe housing and includes means for measuring linear and rotational displacement of the bar with respect to the base, said bar spaced from the arm and extending generally parallel to the plane thereof.

8. An apparatus of the type described in claim 6 wherein a first support arm extends parallel to said first member between said probe mounting means and a member carried on said joint and a second support member extends between the member on said joint and a member on said base, with said first and second support members assisting in supporting said probe and being in the plane of the arm.

9. An apparatus of the type described in claim 8 wherein said first support arm is coupled to displace parallel to said first member and said second support arm is coupled to displace parallel to said second member, and said first support member is coupled to said probe and said second support member is coupled to said probe support means to maintain said probe mounting means in a uniform orientation regardless of the location of the probe mounting means.

10. A coordinate measuring apparatus for measuring a part in cylindrical coordinates about a base, said apparatus comprising:
a probe housing;
an articulated arm defining a plane and mounting said probe housing to said base and allowing displacement of said probe housing with respect to said base;
means for measuring the position of said probe housing with respect to said base, said means including a measuring bar mounted between said base and said probe and means associated with said base and bar for determining linear and angular displacement of said measuring bar with respect to said base in terms of a linear distance and an angular displacement; and
means for mounting a probe to said probe housing for movement in a direction perpendicular to said articulated arm, said means including means for measuring the displacement from a plane including the articulated arm.

* * * * *